United States Patent [19]

Lessman

[11] 4,027,328
[45] May 31, 1977

[54] CATADIOPTRICALLY COUPLED COLOR TELEVISION PROJECTION SYSTEM

[76] Inventor: Gerhard Lessman, 6243 Garfield St., Chino, Calif. 91710

[22] Filed: Nov. 28, 1975

[21] Appl. No.: 635,982

[52] U.S. Cl. .................................. 358/64; 358/239
[51] Int. Cl.² ..................... H04N 9/16; H04N 5/74
[58] Field of Search ............. 358/60, 64; 178/7.85, 178/7.88

[56] References Cited

UNITED STATES PATENTS

| | | | |
|---|---|---|---|
| 2,466,338 | 4/1949 | Traub | 178/7.88 |
| 2,899,490 | 8/1959 | Cheetham et al. | 358/60 X |
| 3,115,544 | 12/1963 | Marley | 358/60 |

*Primary Examiner*—Robert L. Richardson
*Attorney, Agent, or Firm*—Robert K. Wallor

[57] ABSTRACT

A color television projection system that optically combines the outputs of three small cathode ray tubes, each projecting an image in one of three primary colors, to produce a full-color image that is not subject to the usual "color matrix" losses experienced by contemporary television receiver units. This system employs a solid optical system, similar to a classical Schmidt system, but modified by having the necessary colored beamsplitters immersed, as part of the fabrication process, within the solid optics near the primary focal plane to serve as the aperture stop for the system, and further modified by having an air separated corrector lens. Additional light energy efficiency, over contemporary techniques, is obtained by having the cathode ray tube faces immersed within the solid optics and optically coupled thereto by an appropriate optical bonding agent.

18 Claims, 3 Drawing Figures

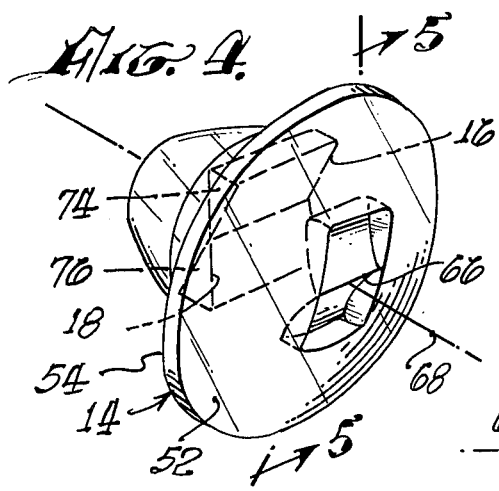
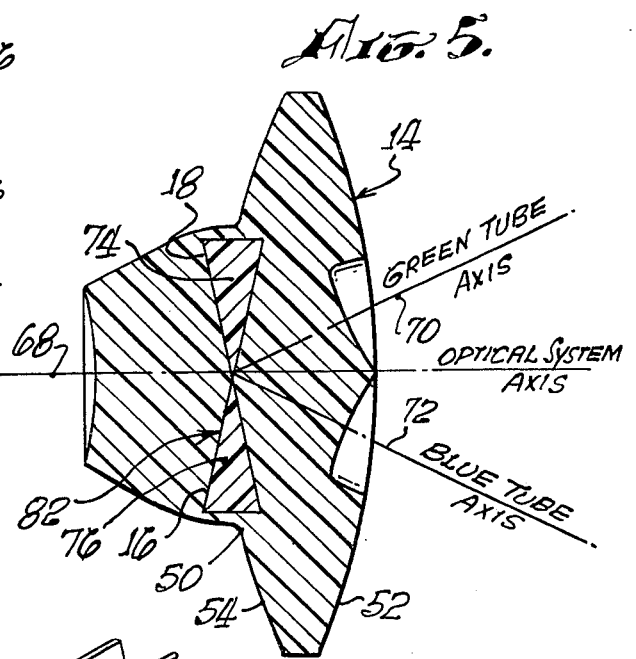
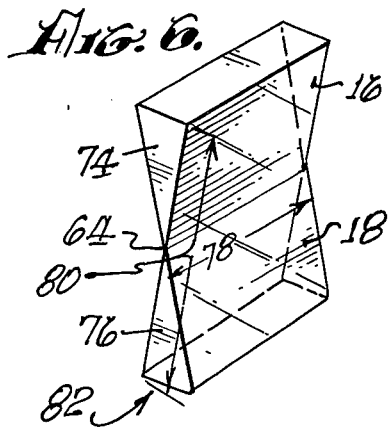
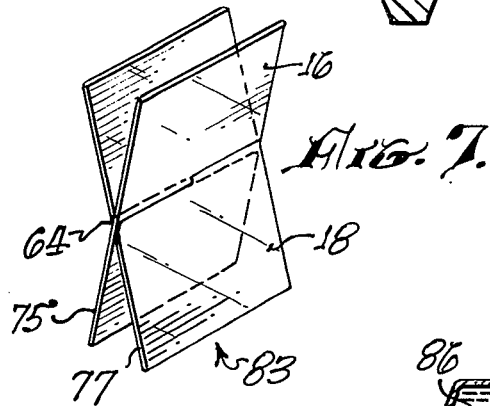
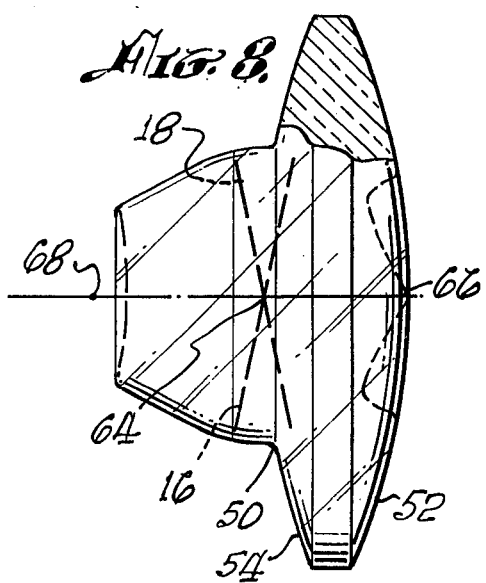
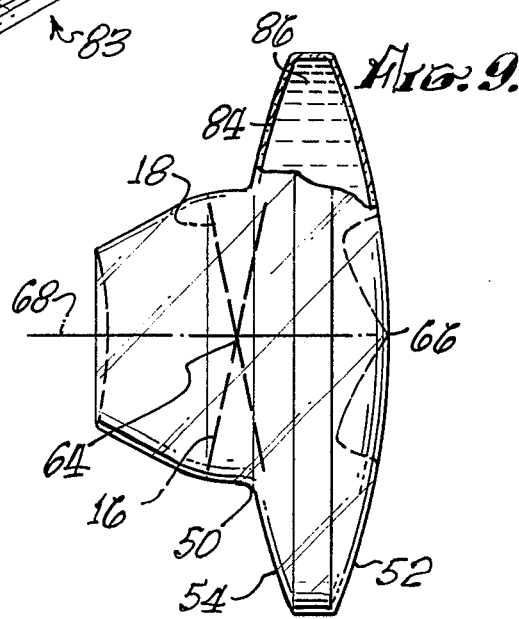

CATADIOPTRICALLY COUPLED COLOR TELEVISION PROJECTION SYSTEM

BACKGROUND OF THE INVENTION

This invention relates to means for the reproduction of visual color television images through the combination of chassis mounted receiver electronics and a projection system, comprised of three cathode ray tubes, an optical system, and a viewing screen; all elements being appropriately supported within, or attached to, a cabinet of appropriate design and construction.

Contemporary color television sets customarily employ large cathode ray tubes, the screens or faceplates of which are fabricated in a manner that results in the display of three primary colors (typically red, green, and blue) via closely adjacent dots or lines of phosphors, commonly known as a matrix. The separation between and size of the dots in the matrix is intended to be sufficiently small so as to escape the notice of the observer. This is not in fact true at close range. In actuality the pattern of the color matrix intrudes upon the attention of the observer and detracts from the picture resolution, particularly after magnification by projection.

The individual color dots necessarily occupy mutually exclusive elements of the screen area. This results in a severe loss of average screen brightness. Although technically color screens produce the three color effect, seen by the eye as full color, through an additive process, in terms of luminous energy it is a subtractive process since the element of the screen that is emitting in one of the three colors cannot, at the same time, emit in the other two colors. The maximum efficiencies of such screens cannot, therefore, exceed 33 percent. However, since the spaces between the typically round dots of color phosphors are usually filled in by a black background material, the actual luminous efficiency of such screens is typically only 17 percent.

Further image brightness and contrast losses arise in standard television picture tubes because the light emitting phosphors are deposited upon the rear, or inner, surface of the tube face. Each phosphor element serves as an approximately Lambertian radiator. Only a small fraction of the emitted light can escape the front face because of a phenomenon describable as critical angle trapping. This results in the larger part of the emitted light being trapped within the tube face where it would ultimately be reflected back upon the phosphors, thereby reducing the contrast of adjacent image areas. To spoil this contrast reducing effect, tube face plates are typically made of dark glass to absorb the stray light from internal reflections. This also improves the picture quality by reducing undesired ambient light reflections. Unavoidably, however, this technique also attenuates the desired image brightness by typically 50 percent. Only about 20 percent of the emitted light is normally recovered because of the combined losses due to trapping and glass attenuation. When these effects are compounded with the efficiency factor resulting from the color dot matrix formation, supra, the typical luminous efficiency of contemporary color television picture tubes rarely exceeds 3.4 percent.

A further disadvantage of contemporary cathode ray tubes is that they have attained their maximum safe size based upon stress considerations. Larger tubes would be subject to the serious danger of catastrophic implosion. Moreover, manufacturing costs of present color tubes are high, based upon the materials, processes, and close tolerances associated with the production of the three-color phosphor dot matrix.

As a result of the public desire for viewing larger television pictures than are possible with present direct viewing cathode ray tubes, attempts have been made to project enlarged images of the tube face upon a screen. Such attempts have met with inferior results due to the attendant enlargement of the color dot matrix which causes severe reduction in resolution and image quality. Moreover, the already gross luminous inefficiency is further reduced incident to the optical enlargement of the image, thereby providing inadequate illumination for comfortable viewing. Efforts to compensate for the losses through the use of higher power levels are not consistent with safety or with current conservation concepts.

Further attempts were made to overcome these disadvantages by the use of three separate cathode ray tubes, each radiating in one of three primary colors. This approach is more attractive because the tubes do not require a color dot matrix and are therefore about six times as efficient. Additionally, single color tubes are much less expensive to manufacture. However, optical problems arise in the execution of this concept. One must either employ a separate optical system for each tube and project three separate images on the screen in perfect registration, or one must combine the optical paths from the three tubes into one optical system through the use of colored beamsplitters. The first alternative approach is costly, bulky, and the necessary image registration is difficult to achieve and maintain. The second alternative is limited to low aperture optical systems incapable of adequate illumination because the strongly diverging beams of large aperture systems cannot be intercepted by reasonably sized, typically 45° angle oriented beamsplitters located between the lens and tubes.

In the invention herein disclosed, the several disadvantages, described above as representative of the prior art, are avoided by the use of novel optical means that permit all of the light, consistent with the aperture (f/number) of the optical system, emitted as the output of three single color cathode ray tubes, each operating in one of three mutually complementary primary colors, to be combined into one large aperture optical system for projection upon a viewing screen.

SUMMARY OF THE INVENTION

The key elements of the color television receiver unit claimed below are the modifications of the classical Schmidt optical system employed. This invention achieves the combination of three primary colors (typically red, green, and blue) into a single full color image through the use of beamsplitters. The basic principle employs a solid optical system rather than a conventional, air-spaced, optical system. Some of the major elements of novelty are the immersion of the colored beamsplitters directly into the solid optics; the placement of the beamsplitters near the focal plane of the primary mirror of the optical system; the use of said beamsplitters as the aperture stop for the optical system; and the direct coupling of immersed cathode ray tube face plates to the solid optics by means of an optical bonding agent, such as a viscous fluid. The use of a separate corrector lens in air, rather than as part of the solid optical system, optionally provides two additional image correcting surfaces, which surfaces can be analytically shown to be not always essential to practice of the invention.

The advantages of this invention are found within the elements of novelty given above and as further illustrated below.

The colored beamsplitters may be fabricated by conventional means as coated plates, as two wedges abutting at their apices, or in any similar configuration. They are then immersed in, and physically incorporated with, the solid optical system. If the materials used for the beamsplitters and for the solid optical system have matching indices of refraction, all surfaces of this assembly, except the color reflective coating, optically disappear, thereby removing multiple internal reflections within the beamsplitter elements and thus improving resolution and image quality.

The placement of the beamsplitters relative to the optical system primary mirror surface and their use as the system aperture stop provide for a reduction in the diameter of the primary mirror surface from that typically required by the well-known classical Schmidt type optical systems. This results from the fact that the diameter of the primary mirror is roughly equal to the diameter of the aperture stop plus twice the tangent of the half field angle times the distance from the stop to the mirror. In a classical Schmidt system, this distance is twice the focal length. In the system herein disclosed, it is only about half the focal length.

The immersion of the cathode ray tube faces within the solid optical system and the use of the optical bonding agent cause the front, or outer surfaces of said tube faces to optically disappear. Consequently, the tube faces need not be made of dark glass for this application, leading to a net five-fold gain in light efficiency over the prior art system. An additional small advantage arises in that when the tube faces are optically coupled to the system, imperfections of the tube face and optical system surfaces are filled in and vanish. The result is a projected picture of greatly improved quality, having a brightness about thirty times that obtainable from an optical system of equivalent f/number projecting from a color dot matrix type tube.

The use of the corrector in air avoids the cost and weight penalties associated with fabricating the entire length of the optical system from the solid material, as in the classical solid Schmidt system. Such separation of the corrector further provides for two additional optical surfaces, over the number associated with the classical solid Schmidt system, which can be used to provide optical power and correction to the system. The use of the separate corrector also permits the employment of a common solid optical system with several correctors of varying optical power to provide systems of varying magnification or focal length at the expense only of different corrector elements.

The principal embodiment of the invention described below was designed for an aperture of f/0.8, with approximately 60 percent central diametral obsuration. When projected upon a slightly specular screen 30 × 40 inch, having a gain of 2.0, from 2.50 × 3.33 inch tube faces (equivalent to 12 times enlargement), at a combined tube brightness of 1,200 foot-lamberts, as measured in air at the tube face, the apparent brightness of the viewing screen is given by the approximate formula:

$$B = \frac{(1 - \phi^2) \, GB_o N^2}{4F^2 M^2 A}$$

where
- $B$ = screen brightness
- $\phi$ = central diametral obscuration
- $G$ = screen brightness gain
- $B_o$ = tube brightness (total of three colors)
- $F$ = f/number of the optical system
- $M$ = magnification
- $N$ = refractive index of the tube faces and
- $A$ = internal transmission of the tube faces measured to provide $B_o$ For the principal embodiment, the screen brightness can be shown to be approximately 21 foot-lamberts. Much higher screen brightnesses will obviously result from the use of more directional, higher gain screens, or greater tube brightnesses.

BRIEF DESCRIPTION OF THE DRAWINGS

FIG. 4 is a perspective view of the solid optical element of the optical system, illustrating the receptacles for two of the cathode ray tubes and the relative placement, in broken line form, of the beamsplitter elements immersed within the optical element.

FIG. 5 is a sectional view taken on line 6—6 of FIG. 4, and further illustrating the construction of the solid optical element as formed from solid acrylic. Again, the color identifications associated with the cathode ray tube axes are merely representative of one typical combination.

FIG. 6 shows, in perspective, the principal embodiment of the beamsplitter element, configured as two wedges abutting at their apices, with the surfaces being mutually coplanar and appropriately coated to be selectively color reflective.

FIG. 7 provides an alternate embodiment of the beamsplitters, comprised of two plates, each coated to be selectively color reflective to the appropriate color, said plates being joined into an assembly through the use of slots traversing half the width of each plate.

FIG. 8 illustrates the solid optical element, in a fragmentary sectional view, showing the alternative material as optical glass.

FIG. 9 illustrates the solid optical element, in a fragmentary sectional view, configured as a shell containing a liquid having an appropriate index of refraction. The beamsplitter elements are affixed to the inner surface of the shell by mechanical mounting means or adhesive means.

DESCRIPTION OF THE PREFERRED EMBODIMENT

Figure 1:
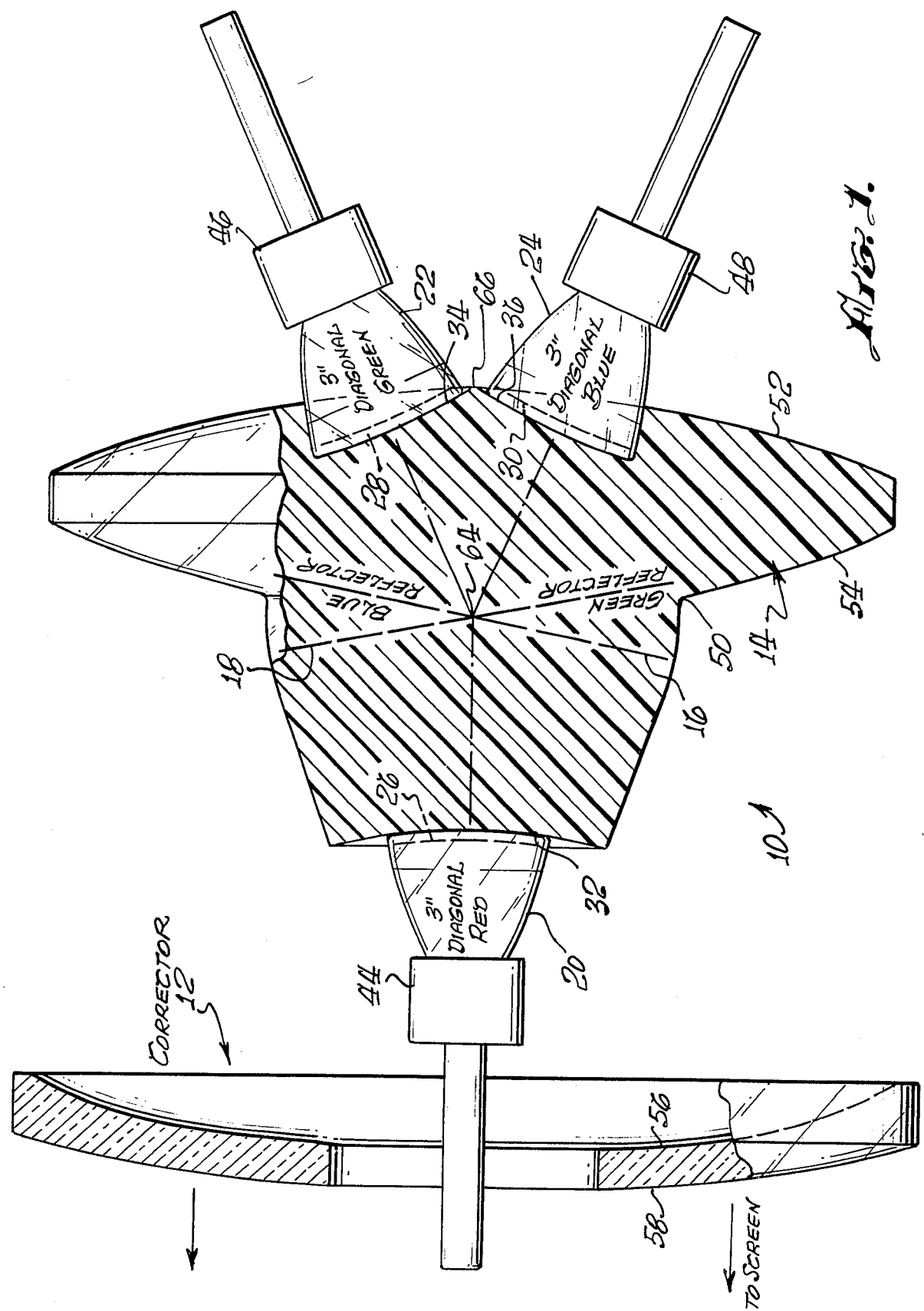
FIG. 1 is partially sectional view of the solid optical system, showing the relationships between the three cathode ray color tubes, the beamsplitters, and the optional corrector. The colors identified on the cathode ray tubes and the beamsplitters are merely illustrative of one of a multiplicity of possible primary color triads, and their respective orientations.
Figure 2:
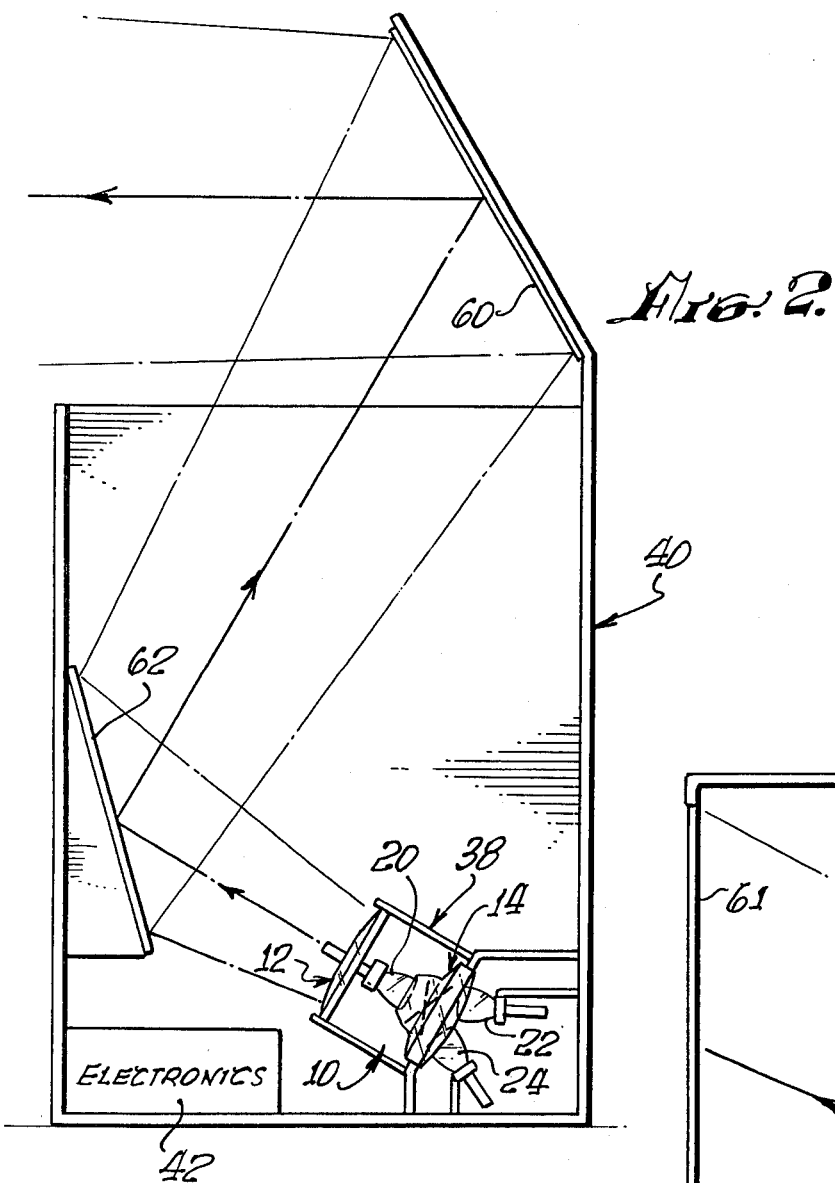
FIG. 2 illustrates, schematically, the principal embodiment of this invention as employed in a projection system, including the necessary screen, mirror, electronics, and cabinet structure.

Referring now to FIG. 1, there is shown an optical system 10 in accordance with the invention which is utilized as part of a television receiver unit, as schematically shown in FIG. 2, to project a color television image. Said optical system 10 is comprised of an optional corrector 12, a solid optical element 14 having embedded therein two beamsplitter planes 16, 18, and having provision for the optical coupling of three cathode ray tubes 20, 22, 24, and three such cathode ray tubes, one 20, having first color phosphor screen 26, one 22 a green phosphor screen 28, and the third 24 a third color phosphor screen 30 said first, second, and third colors forming a triad of primary colors. At the interfaces 32, 34, 36 between the cathode ray tube faces and the solid optical element 14, an optical bonding agent is employed to match the indices of refraction of the tube faces and the solid optical element 14.

The electronics 42 of FIG. 2 provide the appropriate color intensity signals to the cathode ray tubes 20, 22, 24 as well as the electron beam deflection signals to the deflection yokes 44, 46, 48 of the cathode ray tubes 20, 22, 24. As each electron beam is swept across the phosphor screens 26, 28, 30 and varied appropriately in intensity, the phosphors are excited into radiation of first color, second color, and third color light, respectively.

Light energy, corresponding to the first color portion of the full-color television picture, is transmitted, in a Lambertian manner, from the phosphor screen 26 through the tube face material, the interface 32, and into the solid optical element 14. The beamsplitter planes 16, 18 appear transparent to the first color wavelengths. The Lambertian light energy continues through the solid optical element 14, limited in divergence by the diameter shown by radius 50 adjacent to the beamsplitter planes. As the light energy proceeds through the material of the solid optical element 14, it becomes incident upon the rear surface 52, which is coated to be full-color reflective, forming the primary mirror of the optical system 10. The light energy incident upon the central portion of said surface 52 is not of interest in the image projection since it becomes internally reflected into the central diametral obscuration. The light energy incident upon the outer annular portion of the primary mirror surface 52 is reflected back toward the annular forward surface 54, where it is appropriately refracted into an annular bundle directed toward the viewing screen 60 of FIG. 2 in a manner so as to project an enlarged high-resolution image of the first color cathode ray tube face 26 upon said viewing screen. The optional corrector 12 may be employed to intercept the annular light energy bundle exiting from the annular forward surface 54, and, by appropriate refraction through its first and second surfaces 56, 58, further correct the image quality at the viewing screen 60 of FIG. 2, thereby reducing the image corrective power required by the annular forward surface 54.

Light energy, corresponding to the second color portion of the full-color television picture, is transmitted, in a Lambertian manner, from the phosphor screen 28 through the tube face material, the interface 34, and into the solid optical element 14. As the light energy progresses through the material of the solid optical element 14, it impinges upon the beamsplitter planes 16, 18. The beamsplitter plane 16 is transparent to the second color wavelengths while the beamsplitter plane 18 serves as a mirror surface, redirecting the second color light energy toward the rear (primary mirror) surface 52 of the solid optical element 14. The light energy thereupon proceeds through the optical system 10 in a manner identical to that of the first color light energy so that an image of the second color cathode ray tube 22 is projected in registration with the aforesaid first color image.

Light energy from the third color phosphor screen 24 is transmitted through the optical system 10 in a manner identical to that of the second color light energy, except that the roles of the second color and third color beamsplitter planes 16, 18 are reversed; beamsplitter plane 18 being transparent to third color light energy, while beamsplitter plane 16 serves as a planar mirror. Again the projected third color image is projected in registration with the other two color images.

The beamsplitter planes 16, 18 serve as the aperture stop for the Lambertian radiation patterns from the cathode ray tubes 22, 24. Light energy emitted at angles too large to be intercepted by the beamsplitter planes 16, 18 is lost to the system as stray light.

Referring now the FIG. 2, the catadioptric optical system 10 is shown as supported by support means 38 within a cabinet 40. The orientation of said support is not critical to the design except in so far as space must be provided for an optical path of the proper length to image the system upon a viewing screen 60. This optical path is shown, in the principal embodiment, to be folded by a planar mirror 62 rigidly affixed to the cabinet 40. The necessary color television receiver electronics 42 occupy the appropriate volume within the cabinet 40 without infringing upon the optical path. The annular bundle of three color light energy exiting from the optical system proceeds to the mirror 62, where it is folded and directed toward the viewing screen 60, which is of the reflective type having a gain of 2.0 or more. The three color images are in registration at said viewing screen 60 and are enlarged images of the three cathode ray tubes 20, 22, 24 of FIG. 1. Full color is achieved through the well-known color mixing theories of optics.

Referring now to FIG. 4, showing a perspective of solid optical element 14, the orientations of the second color and third color cathode ray tube interface surfaces are indicated. The orientations of the beamsplitter planes 16, 18, shown in broken line form, relative to the interface surfaces are also provided. The line of intersection of the two beamsplitter planes 16, 18 is parallel to the line of intersection 66 of the two cathode ray tube interface surfaces. The recessed volumes, yielding the interface surfaces, formed in the material of the solid optical element 14, accommodate the cathode ray tubes 22, 24 of FIG. 1.

Referring now to FIG. 5, the principal embodiment of the solid optical element is shown in a sectional view. The relative orientations of the beamsplitter plane 18 and beamsplitter plane 16 and the tube interface surfaces are further identified. Beamsplitter plane 18 is oriented orthogonally to the bisector of the angle between the optical system axis 68 and cathode ray tube axis 70. Similarly, beamsplitter plane 16 is orthogonal to the bisector of the angle between the optical system axis 68 and the blue cathode ray tube axis 72. These angular relationships, together with the separations between the beamsplitter planes 16, 18 and the interface surfaces, cause the virtual positions of the second and third color cathode ray tube faces 28, 30 of FIG. 1 to be superimposed and appear to overlay the actual position of the first color cathode ray tube face 26 of FIG. 1. As indicated, the preferred material for the solid optical element 14 is acrylic.

Referring now to FIG. 6, the preferred embodiment of the supporting structure for the beamsplitter planes 16, 18 is shown to be a pair of wedge shaped elements 74, 76 abutting at their apices form a line of intersection 64. The combination of the two members 74, 76 has an x-shaped cross-section orthogonal to said line of intersection 64. The proportion of length of side 78 of the wedge to the diagonal elevation 80 along the planar wedge faces is shown as substantially identical to the ratio of the width of the cathode ray tube face plate to twice its height. However, said wedges 74, 76 may for practical purposes be semi-circular, thus yielding a circular aperture stop with intersection 64 as the diameter. Supporting means are provided to maintain the wedges such that the wedge faces retain a mutually coplanar position.

The beamsplitter planes 16, 18 are formed by vacuum deposition, or other standard processes. The second color reflective coating is applied to the wedge face of the lower wedge element 76 in direct view as shown, and to the obverse wedge face of the upper wedge element 74. The third color reflective coating is applied to the wedge face in view for the upper wedge element 74 and to the obverse wedge face for the lower wedge element 76. The preferred wedge material is acrylic.

Having formed the beamsplitter wedge assembly 82 as discussed above, said assembly, appropriately coated, is placed in a mold having the interior shape of the exterior surface of the solid optical element 74, and supported in the proper position. Acrylic material is then flowed into the mold by standard techniques and allowed to harden, thereby forming a solid unit having preformed optical surface and containing the beamsplitter assembly. The corrector element, if necessary to the performance of the optical system may be independently formed or it may be formed together with the solid acrylic optical element 14 including nonoptical supporting structure.

MODIFICATION AND OTHER EMBODIMENTS

Figure 3:
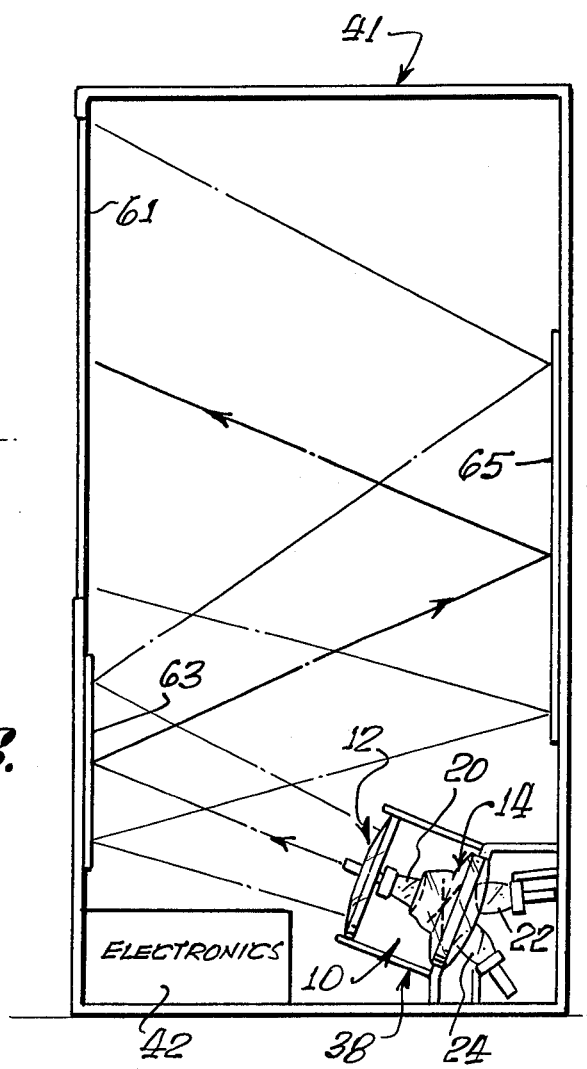
FIG. 3 schematically presents an alternative use of the catadioptrically coupled color television projection system for the illumination of a rear projection screen.

Referring now to FIG. 3, the catadioptrically coupled color television projection system may be utilized to project upon a rear projection type viewing screen 61. In such a color television receiver unit, the optical system 10 is supported by appropriate means, such that the emergent light energy is directed to a folding mirror 63 which directs the light energy to the viewing screen 61, directly or via another folding mirror 65, at which screen the images are formed. The assembly of optical elements, together with the necessary electronics, are enclosed in a cabinet 41.

Referring now to FIG. 7, an alternate form of the beamsplitter assembly 83 is illustrated in perspective. In this structure, the beamsplitter planes 16, 18 are deposited on the front surfaces of planar substrates 75, 77, respectively. Said substrate members 75, 77 each have the dimensional proportions cited for the wedge assembly of the principal embodiment above. The two planar substrates 75, 77 contain slots across half of their width such that the two substrates may be assembled into the x-shaped structure illustrated. Support means are provided to maintain the two planes at the proper angle of intersection during the immersion process of this assembly into the solid optical elements.

Referring now to FIG. 5, the solid acrylic formation of the principal embodiment may be modified by replacing wedge assembly 82 with the beamsplitter assembly 83 of FIG. 7.

Referring now to FIG. 8, the solid optical system may be formed of glass with either the wedge assembly of FIG. 6 or beamsplitter assembly of FIG. 7 immersed therein.

Referring now to FIG. 9, said solid optical system may consist of a hollow irregular shell member, 84 having either the wedge assembly 82 of FIG. 6 or beamsplitter assembly 83 of FIG. 7 supported therein, whereupon the entire remaining internal volume is filled by a liquid 86 having the appropriate optical properties.

Additional embodiments utilize cathode ray tubes of sizes other than those indicated above in the background and summary of this invention. The entire system is therein dimensionally scaled in the appropriate manner.

Omission of the beamsplitter elements and the second color and third color cathode ray tubes, together with the replacement of the first color cathode ray tube with a black and white cathode ray tube, provides for an enlarging projection system for noncolor television receiving units.

The embodiments described above are not to be considered as inclusive of all applications of the invention herein claimed. Whatever may be the modification or a new embodiment, the purpose remains to provide means for projecting an enlarged visual image originating from a small, low cost, low power source with a minimization of optical losses.

I claim:

1. An optical system similar to the classical Schmidt type, having a plurality of beamsplitter surfaces embedded within an optical element which forms the converging portion of said optical system and a plurality of cathode ray tubes immersed within said optical system such that optical paths from the emitting faces of said cathode ray tubes remain within said optical system until the several images of said cathode ray tube faces are superimposed in registration for projection by said optical system.

2. The optical system defined in claim 1, wherein a corrector lens, separated by air from the converging portion of said optical system is included to provide added image correction capability to said optical system.

3. The optical system defined in claim 1, wherein the converging portion of said system is formed from solid material.

4. The optical system defined in claim 3, wherein acrylic is used to form the elements.

5. The optical system defined in claim 3, wherein optical glass is used to form the convergent portion of said system.

6. The optical system defined in claim 1, wherein the converging portion of said system is formed, from a solid optical material shaped into an envelope containing solid immersed beamsplitter elements and filled with a liquid having consistent optical properties.

7. An optical projection system similar to the classical Schmidt type, comprised of an optical converging portion having immersed therein two beamsplitter planes and three single color cathode ray tubes, such that one of said cathode ray tubes, emitting television images in one of a set of three complementary primary colors is immersed on the axis of said optical converging portion in a manner so as to directly illuminate a primary mirror surface located at the opposite end of said converging portion, said images passing through the beamsplitters which are transparent to said color and being angularly limited by an aperture stop created by the dimensions of said converging portion orthogonal to the axis in the region occupied by the immersed beamsplitters, said images being reflected and enlarged by the shape of the primary mirror surface to refractively exit from said converging portion through an appropriately shaped annular surface region into air as an annular bundle which projects an enlarged image of said cathode ray tube; and such that a second of the three cathode ray tubes, emitting television images in a second of the set of three complementary primary colors is immersed into the primary mirror surface of said converging element such that said second color images are transmitted through the material of said converging element unimpeded by one of the two beamsplitter planes, namely the one coated so as to be reflective to the third of the set of three complementary primary colors, until they impinge upon the other, second-color-reflective beamsplitter plane, whereupon the appropriately divergent images are reflected toward said primary mirror surface in superposition with said first color images for projection through the balance of said optical system, said second-color-reflective beamsplitter surface serving as the aperture stop for these images; and such that the third of said cathode ray tubes, emitting television images in the third of the set of three complementary primary colors, is immersed into said primary mirror surface in a manner similar to that of said second color cathode ray tube, such that third color images are projected through said optical system like those from said second color cathode ray tube, except that the second-color-reflective beamsplitter surface appears transparent to said third color images, while the third-color-reflective beamsplitter surface reflects said third color images toward said primary mirror surface, said beamsplitter planes being disposed so as to superimpose said second color and third color images upon the system axis in registration with said first color images.

8. The optical system of claim 7, wherein the converging portion of said system is formed of acrylic material.

9. The optical system of claim 7, wherein the converging portion of said system is formed of optical glass.

10. The optical system of claim 7, wherein the converging portion of said system is formed from a solid optical material shaped into an envelope containing solid immersed beamsplitter elements and filled with a liquid having optical properties consistent with the requirements of said system.

11. A color television receiver and projection system, comprised of the necessary electronics, supporting structures, cabinet, and viewing screen, wherein the improvement comprises the application of a modified solid Schmidt optical system having two beamsplitter surfaces embedded with said optical system, and having three single color cathode ray television picture tubes immersed therein such that the cathode ray tube faces are in direct physical contact with said solid optical element, each of said cathode ray tubes emitting images in one of a set of three primary colors, said beamsplitter surfaces and said cathode ray tube faces being mutually disposed so as to transmit the three single color images through said solid optical system so as to result in a superimposed full-color image which is projected upon said viewing screen.

12. The color television receiver system defined in claim 11 wherein said modified solid Schmidt optical system includes a corrector lens separated by air from the converging portion of said system.

13. The receiver system defined in claim 11, wherein optical glass is used to form the optical elements.

14. The receiver system defined in claim 11 wherein acrylic material is used to form the convergent portion of the optical system.

15. The receiver system defined in claim 11 wherein an appropriately shaped envelope of solid optical material, filled with a liquid having consistent optical properties, and having solid beamsplitter elements rigidly contained within the liquid is used to form the converging portion of said optical system.

16. The optical system defined in claim 11 wherein the immersed beamsplitter elements form the aperture stop for the system.

17. The optical system defined in Claim 1, wherein the immersed beamsplitter elements form the aperture stop for the system.

18. The optical system defined in Claim 7, wherein a corrector lens, separated by air from the converging portion of said optical system is included to provide added image correction capability to said optical system.

* * * * *